US010828955B1

(12) United States Patent
Edren et al.

(10) Patent No.: US 10,828,955 B1
(45) Date of Patent: Nov. 10, 2020

(54) VEHICLE SUSPENSION SYSTEM WITH REMOTE ACTUATION

(71) Applicant: Zoox, Inc., Foster City, CA (US)

(72) Inventors: Johannes Edren, Belmont, CA (US); Ahditya Melkote, Foster City, CA (US); Phillip Newport Kuys, Adelaide (AU); Andrew James Webb, Adelaide (AU); Paul Choin, Pleasanton, CA (US)

(73) Assignee: Zoox, Inc., Foster City, CA (US)

( * ) Notice: Subject to any disclaimer, the term of this patent is extended or adjusted under 35 U.S.C. 154(b) by 174 days.

(21) Appl. No.: 16/023,649

(22) Filed: Jun. 29, 2018

(51) Int. Cl.
*B60G 17/00* (2006.01)
*B60G 15/12* (2006.01)
*B60G 17/0165* (2006.01)
*B60G 17/052* (2006.01)

(52) U.S. Cl.
CPC ......... *B60G 17/0165* (2013.01); *B60G 15/12* (2013.01); *B60G 17/0528* (2013.01)

(58) Field of Classification Search
CPC . B60G 17/0165; B60G 15/12; B60G 17/0528
See application file for complete search history.

(56) References Cited

U.S. PATENT DOCUMENTS

| | | | | |
|---|---|---|---|---|
| 5,369,582 A * | 11/1994 | Gorny | ................... | B60G 17/018 701/37 |
| 5,383,123 A * | 1/1995 | Kunz | ................. | B60G 17/0164 280/5.513 |
| 7,976,030 B2 * | 7/2011 | Michel | ..................... | B60G 7/04 267/177 |
| 2004/0130079 A1 * | 7/2004 | Gold | .................... | B60G 15/068 267/64.23 |
| 2007/0132163 A1 * | 6/2007 | Timoney | .............. | B60G 17/048 267/34 |
| 2007/0185623 A1 * | 8/2007 | Chen | ..................... | B60W 30/04 701/1 |
| 2008/0202875 A1 * | 8/2008 | Siebeneick | ........ | B60G 17/0152 188/298 |
| 2009/0065314 A1 * | 3/2009 | Kondo | ..................... | F16F 9/18 188/290 |
| 2009/0146385 A1 * | 6/2009 | Michel | ..................... | B60G 7/04 280/5.514 |
| 2012/0133334 A1 * | 5/2012 | Lachenmeier | ..... | B60G 17/0157 320/137 |

(Continued)

*Primary Examiner* — Tyler J Lee
(74) *Attorney, Agent, or Firm* — Lee & Hayes, P.C.

(57) ABSTRACT

A suspension system for controlling movement of a vehicle wheel may include a spring and damper assembly coupling the wheel to the vehicle chassis for movement of the wheel relative to the vehicle chassis. The spring and damper assembly may include a spring coupled to a damper member configured to extend and retract the wheel relative to the vehicle chassis. The suspension system may further include a damper actuator located remotely from the spring and damper assembly and configured to modify an amount of damping and/or wheel extension. The suspension system may also include a spring actuator integrated with the damper actuator and configured to control an amount of deflection of the spring and/or to alter a spring rate. The damper actuator may be provided at a location in the vehicle separated from the spring and damper assembly.

20 Claims, 6 Drawing Sheets

(56) References Cited

U.S. PATENT DOCUMENTS

| | | | | |
|---|---|---|---|---|
| 2014/0217693 A1* | 8/2014 | Schmidt | ............ | B60G 17/0272 |
| | | | | 280/124.162 |
| 2014/0260233 A1* | 9/2014 | Giovanardi | ......... | F15B 13/0444 |
| | | | | 60/431 |
| 2014/0316637 A1* | 10/2014 | Rhode | .................... | B60G 17/02 |
| | | | | 701/29.1 |
| 2015/0224845 A1* | 8/2015 | Anderson | ............ | B60G 17/052 |
| | | | | 701/37 |

* cited by examiner

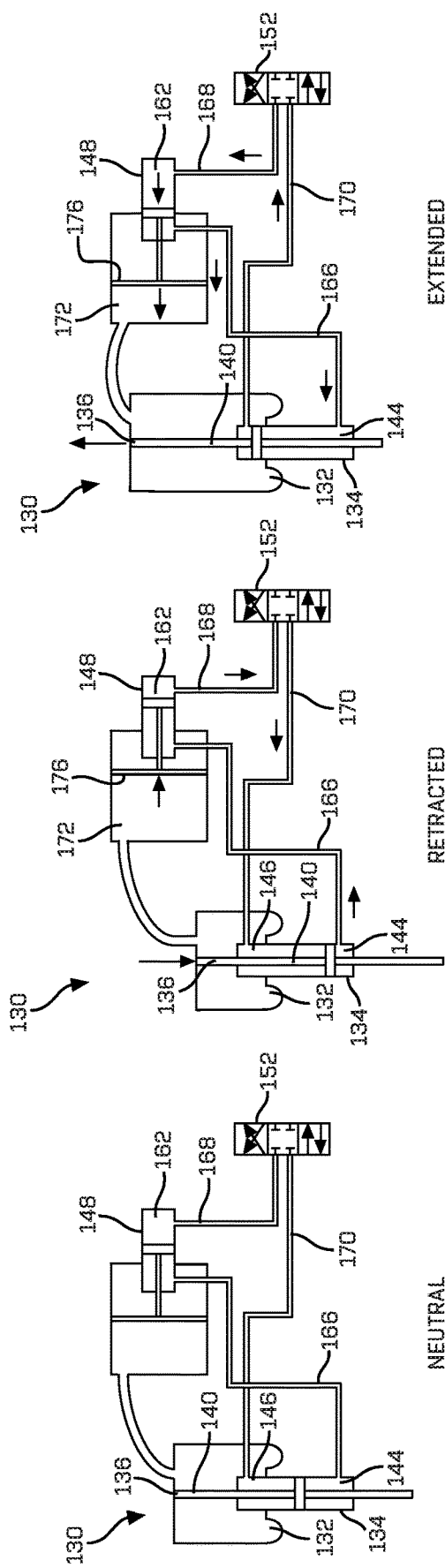

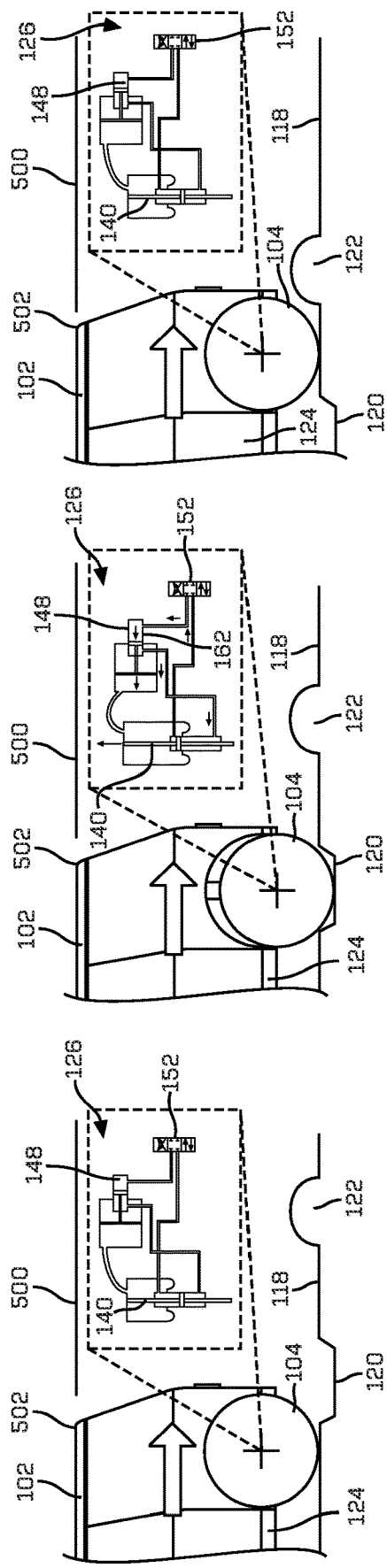
FIG. 5A
FIG. 5B
FIG. 5C
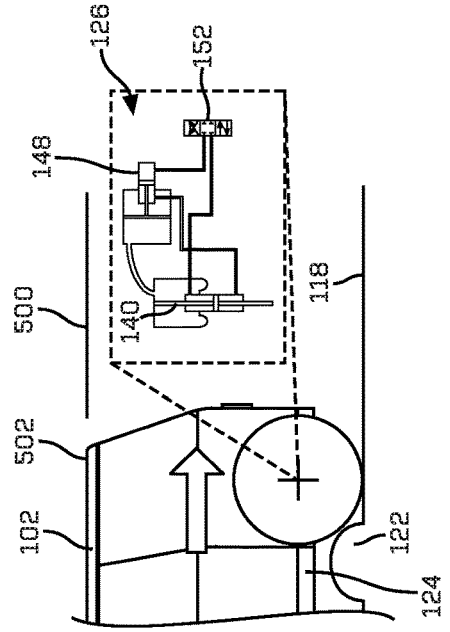
FIG. 5D
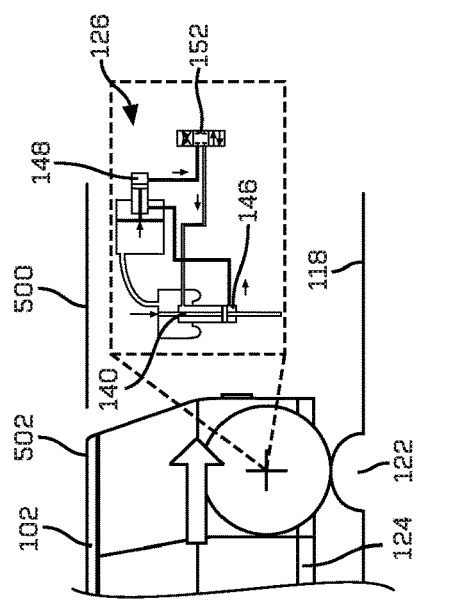
FIG. 5E

VEHICLE SUSPENSION SYSTEM WITH REMOTE ACTUATION

BACKGROUND

Vehicles may include a suspension system to enhance the comfort of passengers of the vehicle or improve the performance of the vehicle as it travels across uneven surfaces. A suspension system may include assemblies at each wheel of the vehicle including a spring to reduce the force transferred to a chassis of the vehicle as the vehicle travels across a depression or over bump in the surface, and a damper to control oscillations or rebound of the spring as it reacts to the force input. In a passive suspension system, the spring and damper react to the energy transmitted to the spring and damper as the wheel travels across the uneven surface. In a semi-active or active suspension system, the spring and damper may receive a force input from the vehicle to counteract the force input from the uneven surface in addition to receiving the force input from the uneven surface.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 4A is a schematic view of an example spring and damper assembly, and an example damper actuator and an example spring actuator shown in a neutral condition.

FIG. 4B is a schematic view of the examples shown in FIG. 4A in a retracted condition.

FIG. 4C is a schematic view of the examples shown in FIG. 4A in an extended condition.

FIG. 5A is a first view of a sequence of views in which an example vehicle having an example suspension system and corresponding wheel travels across an uneven surface including a depression and a bump or protrusion, showing an example response of the suspension system.

FIG. 5B is a second view of the sequence of views showing the example suspension system and corresponding response of the suspension system.

FIG. 5C is a third view of the sequence of views showing the example suspension system reacting upon movement of the correspond wheel past the depression.

FIG. 5D is a fourth view of the sequence of views showing the example suspension system and corresponding wheel reacting to the bump.

FIG. 5E is a fifth view of the sequence of views showing the example suspension system reacting upon movement of the correspond wheel past the bump.

DETAILED DESCRIPTION

Figure 1:
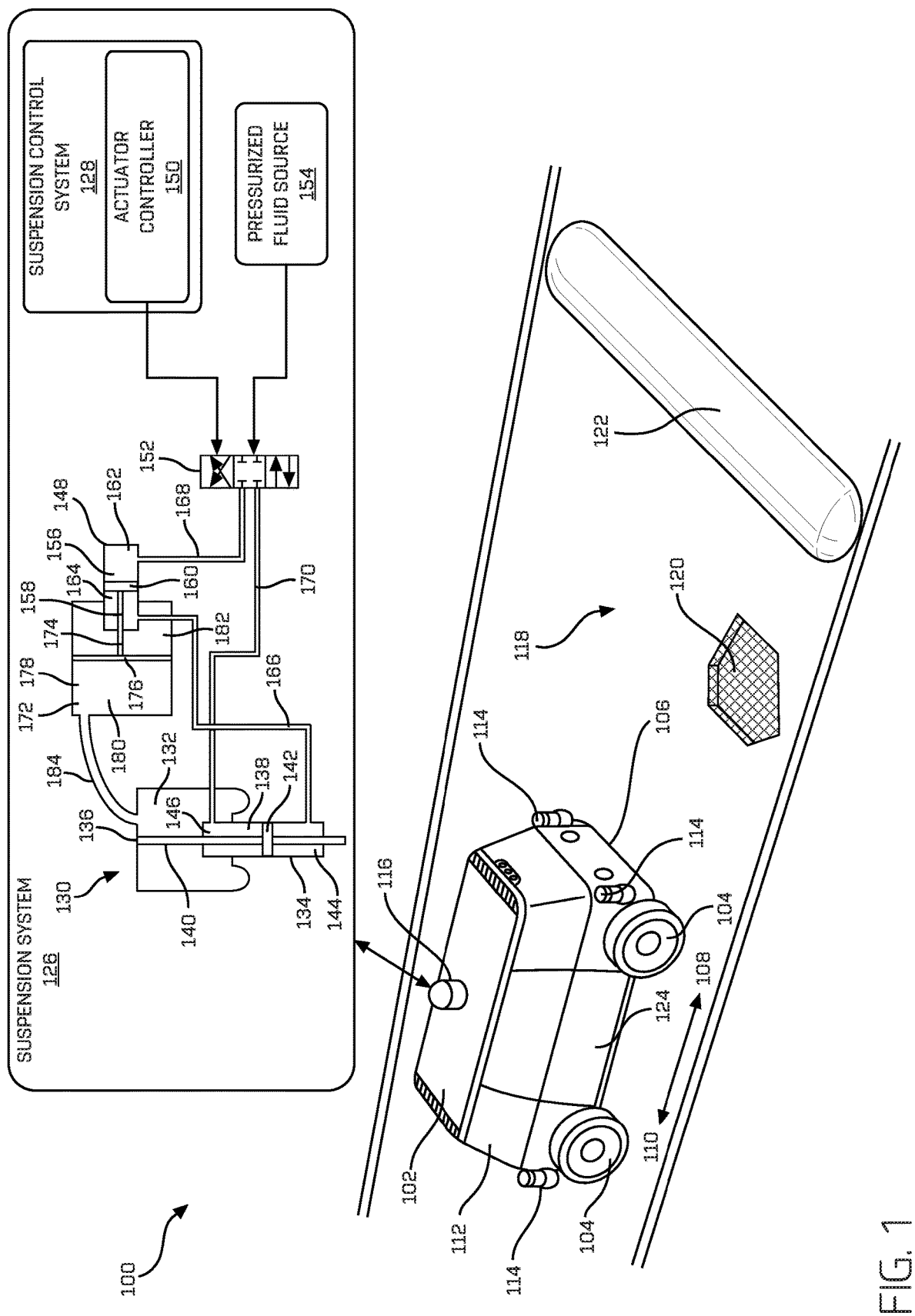
FIG. 1 is a perspective view of an example vehicle traveling on an uneven surface and including a schematic depiction of a portion of an example suspension system.

This disclosure is generally directed to a suspension system, components of a suspension system, and related methods. The suspension system may include a spring and damper assembly coupling a wheel to a vehicle chassis for movement of the wheel relative to the vehicle chassis. The spring and damper assembly may include a spring coupled to a damper member configured to extend and retract the wheel relative to the vehicle chassis. The suspension system may further include a damper actuator located remotely from the spring and damper assembly and configured to cause the damper member to extend and retract. For example, the damper actuator may be configured to actuate the damper member in a non-linear manner, may be physically remote from the damper member (e.g., in a part of the vehicle spaced from the damper member), and/or may be actuated via one or more intermediary components (e.g., a hydraulic component, a pneumatic component, a mechanical component, and/or some other actuation component). In some examples, the damper actuator may be provided at a location in the vehicle separated from the spring and damper assembly and hydraulically coupled to the damper member, for example, via a hydraulic line providing flow communication between the damper actuator and the damper member. In such examples, actuation of the damper actuator results modifying an amount of damping force available for the suspension system. In at least some examples, such modification is a result of a retraction or extension of the damper member (e.g., a damper rod of the damper member). Because the damper actuator is remote from the corresponding spring and damper assembly, the damper actuator may be coupled to the vehicle chassis at a location other than near the wheel corresponding to the spring and damper assembly. In some examples, this may result in increasing design options for the vehicle and improve packaging of components of the suspension system. For example, the vehicle may have a lower aerodynamic profile due to the more compact design, and the steering angle may be increased due to increased clearance around the wheels, for example, because it is not necessary for the damper actuator to be linearly coupled to the damper member.

In some examples, the damper actuator may include a hydraulic cylinder hydraulically coupled to the damper member and configured to modify an amount of damping provided. In some examples, the damper member may include a damper cylinder, a damper rod coupled to the damper cylinder and configured to extend and retract relative to the damper cylinder, and a damper piston coupled to the damper rod. The damper cylinder and the damper piston may define a damper extension chamber and a damper retraction chamber, and the damper extension chamber and the damper retraction chamber may each be configured to receive and/or transmit fluid from the damper actuator causing extension and/or retraction of the damper rod relative to the damper cylinder, thereby modifying an amount of damping provided by the system. For example, the damper actuator may include a hydraulic cylinder hydraulically coupled to the damper member via a hydraulic line and configured to cause the damper member to extend and retract. In some examples, the damper actuator may include a damper actuator cylinder, a damper actuator rod coupled to the damper actuator cylinder and configured to extend and retract relative to the damper actuator cylinder, and a damper actuator piston coupled to the damper actuator rod. The damper actuator cylinder and the damper actuator piston may define a damper actuator extension chamber and a damper actuator retraction chamber, and the damper actuator extension chamber and the damper actuator retraction chamber may be configured to receive and transmit fluid causing extension and retraction of the damper actuator rod relative to the damper actuator cylinder.

In some examples, the assembly may include a pneumatic spring, and the suspension system may further include a spring actuator located remotely from the pneumatic spring and configured to control an amount of deflection of the pneumatic spring and/or alter a spring rate of the pneumatic spring. For example, the damper actuator may be coupled to the spring actuator, such that activation of the damper actuator causes activation of the spring actuator. In some examples, the damper actuator may include a damper actuator rod, and the spring actuator may include a spring actuator rod coupled to the damper actuator rod. In some examples, the spring actuator may include a pneumatic piston coupled to the damper actuator rod, such that movement of the damper actuator rod causes movement of the pneumatic piston.

In some examples, the suspension system may include a pneumatic line coupled to the spring actuator and the pneumatic spring and providing flow communication between the spring actuator and the pneumatic spring. In some examples, the suspension system may also include a hydraulic line coupled to the damper actuator and the damper member and providing flow communication between the damper actuator and the damper member. In some examples, the suspension system may include a hydraulic control valve in flow communication with the damper actuator and configured to control flow of fluid to and from the damper actuator. In some such examples, the suspension system may also include an actuator controller configured to control the hydraulic valve to cause activation of the damper actuator to cause extension and retraction of the damper member.

This disclosure is also directed to a method for controlling movement of a vehicle wheel relative to a vehicle chassis. The method may include actuating a damper actuator located remotely from a damper member coupled to a vehicle, the damper member configured to be coupled to a vehicle wheel and a vehicle chassis, which, when actuated, causes the damper member to one of extend or retract relative to the vehicle chassis. The method may also include actuating a spring actuator located remotely from a spring coupled to the damper member to control an amount of deflection of the spring and/or to change a spring rate of the pneumatic spring. In some examples of the method, actuating the damper actuator may include operating a hydraulic control valve in flow communication with the damper actuator. In some examples of the method, actuating the damper actuator and actuating the spring actuator may include concurrently (e.g., substantially simultaneously) actuating the damper actuator and actuating the spring actuator.

This disclosure is also generally directed to an autonomous vehicle including a vehicle chassis, a wheel, and a suspension system coupled to the vehicle chassis and the wheel. The suspension system may include a spring and damper assembly coupling the wheel to the vehicle chassis for movement of the wheel relative to the vehicle chassis. The spring and damper assembly may include a spring coupled to a damper member configured to extend and retract the wheel relative to the vehicle chassis. The suspension system may also include a damper actuator located remotely from the spring and damper assembly and configured to cause the damper member to extend and retract, and a suspension control system configured to control actuation of the damper actuator. In some examples, the suspension control system may include an actuator controller coupled to a hydraulic control valve, and the damper actuator may include a hydraulic cylinder hydraulically coupled to the damper member and the hydraulic control valve. The hydraulic control valve may be configured to cause the hydraulic cylinder of the damper actuator to extend and retract and, in some examples, thereby causing the damping force to be modified.

In some examples, the autonomous vehicle may also include a perception system configured to generate a signal indicative of an unevenness of a surface on which the autonomous vehicle travels and/or perform localization against a map in order to determine an unevenness of a surface. In some such examples, the suspension control system may be configured to control actuation of the damper actuator based at least in part on the signal or data from the map indicative of the unevenness of the surface.

In some examples, the autonomous vehicle may include a first spring and damper assembly coupling a first wheel to the vehicle chassis for movement of the first wheel relative to the vehicle chassis. The autonomous vehicle may also include a first damper actuator located remotely from the first spring and damper assembly and configured to cause the first damper member to extend and retract. The autonomous vehicle may also include a second spring and damper assembly coupling a second wheel to the vehicle chassis for movement of the second wheel relative to the vehicle chassis, and a second damper actuator located remotely from the second spring and damper assembly and configured to cause the second damper member to extend and retract.

In some examples, suspension system may include a first spring and damper assembly configured to couple a first wheel to the vehicle chassis for movement of the first wheel relative to the vehicle chassis, a second spring and damper assembly configured to couple a second wheel to the vehicle chassis for movement of the second wheel relative to the vehicle chassis, a third spring and damper assembly configured to couple a third wheel to the vehicle chassis for movement of the third wheel relative to the vehicle chassis, and a fourth spring and damper assembly configured to couple a fourth wheel to the vehicle chassis for movement of the fourth wheel relative to the vehicle chassis.

This disclosure is also generally directed to a method for controlling movement of a vehicle wheel relative to a vehicle chassis of a vehicle. The method may include generating a signal for extending and/or retracting a damper actuator located remotely from a damper member coupled to the vehicle wheel. The method may also include activating a hydraulic control valve based at least in part on the signal, and causing the damper actuator to extend and/or or retract based at least in part on activating the hydraulic control valve to cause the damper member to extend and/or retract relative to the vehicle chassis. The method may also include actuating a spring actuator located remotely from a pneumatic spring coupled to the damper member to control an amount of deflection of the pneumatic spring and/or to change a spring rate of the pneumatic spring. In some examples of the method, generating a signal for extending and/or retracting the damper actuator may include receiving a signal indicative of an unevenness of a surface on which the vehicle is traveling, and causing the damper actuator to extend and/or retract may include causing the damper actuator to extend and retract, such that the damper member extends and retracts to follow the unevenness of the surface while substantially maintaining a level attitude of the vehicle.

The techniques and systems described herein may be implemented in a number of ways. Example implementations are provided below with reference to the figures.

FIG. 1 shows an example environment 100 through which an example vehicle 102 is traveling. The example vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 104, the systems and methods described herein may be incorporated into vehicles having fewer or a greater number of wheels, tires, and/or tracks. In some examples, the vehicle 102 may be a bi-directional vehicle. For example, the vehicle 102 may have four-wheel steering and may operate generally with equal performance characteristics in all directions, for example, such that a first end 106 of the vehicle 102 is the front end of the vehicle 102 when travelling in a first direction 108, and such that the first end 106 becomes the rear end of the vehicle 102 when traveling in the opposite, second direction 110, as shown in FIG. 1. Similarly, a second end 112 of the vehicle 102 is the front end of the vehicle 102 when travelling in the second direction 110, and such that the second end 112 becomes the rear end of the vehicle 102 when traveling in the opposite, first direction 108. These example characteristics may facilitate greater maneuverability, for example, in small spaces or crowded environments, such as parking lots and urban areas.

The vehicle 102 may travel through the environment 100, relying at least in part on sensor data indicative of objects in the environment 100 in order to determine trajectories of the vehicle 102. For example, as the vehicle 102 travels through the environment 100, one or more image capture devices 114, light detection and ranging (LIDAR) sensors 116, and/or other types of sensors, capture data associated with detected objects (e.g., vehicles, pedestrians, buildings, barriers, unevenness in the surface on which the vehicle 102 travels, etc.). In some examples, the image capture devices 114 may include, for example, RGB-cameras, monochrome cameras, intensity (grey scale) cameras, infrared cameras, ultraviolet cameras, depth cameras, stereo cameras, and the like. Other types of sensors may include, for example, radio detection and ranging (RADAR) sensors, one or more ultrasonic transducers, such as a sound navigation and ranging (SONAR) sensor, or other known sensor types. The data captured may be used, for example, as input for determining trajectories for the vehicle 102 and/or for other purposes.

As schematically depicted in FIG. 1, the vehicle 102 may travel on a surface 118, such as, for example, any road surface (e.g., tarmac, asphalt, gravel, etc.). As shown in FIG. 1, the surface 118 may include areas of unevenness, such as, for example, a depression 120 (e.g., a pothole or a dip in the surface 118) or a bump or protrusion 122 (e.g., a speed bump or heave in the surface 118). As the vehicle 102 travels across such uneven regions, the surface 118 exerts a force on the wheel or wheels 104 that is transmitted through the wheel(s) 104 to a vehicle chassis 124 of the vehicle 102 via a suspension system 126 coupling the wheels 104 to the vehicle chassis 124.

As shown in FIG. 1, the suspension system 126 may include a suspension control system 128 configured to control one or more components of the suspension system 126, for example, as described herein. In some examples, one or more (e.g., each) of the wheels 104 may be coupled to the vehicle chassis 124 by a spring and damper assembly 130 coupling a respective wheel 104 to the vehicle chassis 124 for movement of the wheel 104 relative to the vehicle chassis 124. The spring and damper assembly 130 may include a spring 132 coupled to a damper member 134, the assembly 130 configured to extend and retract the wheel 104 relative to the vehicle chassis 124. In some examples, the spring 132 may include a coil spring, a leaf spring, a torsion bar, a pneumatic spring, and or any other type of suitable member capable of deforming to absorb forces imparted by the surface 118. In some examples, for example, as shown in FIG. 1, the damper member 134 may include a strut 136 coupled to a suspension control arm coupled to the wheel 104 and the vehicle chassis 124, and extension and retraction of the strut 136 may cause the wheel 104 to respectively extend away from the vehicle chassis 124 (e.g., raising the vehicle chassis 124 relative to the surface 118 at the wheel 104) and/or to retract closer to the vehicle chassis 124 (e.g., lowering the vehicle chassis 124 relative to the surface 118 at the wheel 104). In some examples, the damper member 134 may be a hydraulic damper member, including, for example, a damper cylinder 138, a damper rod 140, and a damper piston 142. For example, the damper rod 140 may be coupled to the damper cylinder 138 and configured to extend and retract relative to the damper cylinder 138. In some examples, the damper rod 140 is coupled to one end of the spring 132, for example, as shown in FIG. 1. For example, the spring 132 may include a pneumatic spring, and in some examples, the strut 136 may be coupled to an end of the pneumatic spring. The damper piston 142 may be coupled to the damper rod 140, and the damper cylinder 138, and the damper piston 142 may define a damper extension chamber 144 and a damper retraction chamber 146. In some examples, the damper extension chamber 144 and the damper retraction chamber 146 may be configured to receive fluid causing extension and retraction of the damper rod 140 relative to the damper cylinder 138. In some examples, the damper rod 140 may serve as the strut 136.

In some examples, the spring and damper assembly 130 may be configured to operate in a passive manner, such that, for example, as the spring 132 is compressed and expanded (for example, by traversing uneven surfaces), the damper member 134 retracts and extends as a result of force inputs exerted on the spring 132. In such examples, the damper member 134 may include one or more valves configured to permit fluid flow, such that the damper member rod 140 may reciprocate within the damper cylinder 138, for example, to control oscillations or rebound of the spring 132 as it reacts to force inputs. Such actuation of the damper assembly 130 may occur passively by the wheel 104 as it travels across unevenness of the surface 118, such as a depression 120 and/or bump 122, or in some instances, as the vehicle 102 travels around a curve, thereby generating compressive forces on the wheels 104 of the vehicle 102 on the outside of the curve, and expansive forces on the wheels 104 of the vehicle 102 on the inside of the curve. In some examples, for example, as shown in FIG. 1, the spring 132 and the damper member 134 may be integrated with one another such that they operate together (i.e., movement of one actuator causes/effectuates actuation of the other). In other examples, the spring 132 and the damper member 134 may operate independently of one another.

In the example shown in FIG. 1, the suspension system 126 also includes a damper actuator 148 located remotely from the spring and damper assembly 130 (e.g., spaced from the spring and damper assembly 130) and configured to cause the damper member 134 to extend and retract (e.g., cause the damper rod 140 to extend and retract from the damper cylinder 138). For example, as shown in FIG. 1, the example suspension system 126 includes an actuator controller 150 configured to cause a hydraulic control valve 152 (e.g., a shuttle valve) to supply hydraulic fluid from a pressurized fluid source 154 (e.g., a hydraulic pump) to the damper actuator 148 to cause the damper actuator 148 to operate to extend and retract the damper member 134. For example, the damper actuator 148 may include a damper actuator cylinder 156 and a damper actuator rod 158 coupled to the damper actuator cylinder 156 and configured to extend and retract relative to the damper actuator cylinder 156. The damper actuator 148 may also include a damper actuator piston 160 coupled to the damper actuator rod 158, and the damper actuator cylinder 156, and the damper actuator piston 160 may define a damper actuator extension chamber 162 and a damper actuator retraction chamber 164. In such examples, the damper actuator extension chamber 162 and the damper actuator retraction chamber 164 are configured to transmit and receive pressurized fluid from the pressurized fluid source 154 via operation of the hydraulic control valve 152, thereby causing extension and retraction of the damper actuator rod 158 relative to the damper actuator cylinder 156, thereby modifying the damping force available for the suspension system.

In some examples, the damper actuator 148 may be located in a portion of the vehicle 102 spaced from the damper member 134. For example, the damper actuator 148 may be located in portion of the vehicle 102 to lower the center of gravity of the vehicle 102, for example, in a lower portion of the vehicle chassis 124 (e.g., under the floor). In some examples, the damper actuator 148 may be located behind and/or under seats of the vehicle 102.

The example shown in FIG. 1 also includes a first fluid line 166 (e.g., a hydraulic fluid line) providing flow communication between the damper actuator retraction chamber 164 and the damper member extension chamber 144, and a second fluid line 168 (e.g., a hydraulic fluid line) providing flow communication between the damper actuator extension chamber 162 and the hydraulic control valve 154. The example suspension system 126 also includes a third fluid line 170 (e.g., a hydraulic fluid line) providing flow communication between the hydraulic control valve 154 and the damper member retraction chamber 146.

In this example configuration, the hydraulic control valve 154 may be operated to supply pressurized fluid to the damper member extension chamber 162 (i.e., via line 168), causing the damper actuator piston 160 to force fluid through the first fluid line 166 to the damper member extension chamber 144. Such a change in fluid levels is associated with a change in the damping force supplied. Additionally, such a change may further cause the damper member piston 142 to extend the damper member rod 140 (e.g., the strut 136), raising the vehicle chassis 124 relative to the surface 118 at the wheel 104. As the damper member rod 140 raises, the volume of the damper member retraction chamber 146 to be reduced, sending fluid through the third fluid line 170 and back to the valve 152.

Such a process may be performed in reverse, for example, as the hydraulic control valve 152 may also be operated to supply pressurized fluid via the third fluid line 170 to the damper member retraction chamber 146 causing the damper member piston 142 to retract the damper member rod 140 (e.g., the strut 136). In such instances, the hydraulic control valve 154 may be operated to allow fluid to be forced from the damper actuator extension chamber 162 as the damper actuator piston 160 is forced to reduce the damper actuator extension chamber 162 under fluid pressure from fluid received from the damper member extension chamber 144 via the first fluid line 166. In this example manner, the damper member rod 140 (e.g., the strut 136) is caused to retract, thereby causing the wheel 104 coupled to the spring and damper assembly 130 to retract toward the vehicle chassis 124, thereby lowering the vehicle chassis 124 relative to the surface 118 at the wheel 104. In some examples, a similar configuration (or the same configuration) may be applied to two or more (e.g., each) of the wheels 104 of the vehicle 102.

In some configurations, the actuator controller 150 may be configured to operate the hydraulic control valve 154 to actively control extension and retraction of the strut 136 coupled to the corresponding wheel 104, and thereby reduce the effects of force exerted on the vehicle chassis 124 by unevenness in the surface 118 as the vehicle 102 travels over the surface 118. This, in turn, may enhance the comfort to passengers in the vehicle 102 as it travels between a trip origin and a trip destination. In some examples, actively causing extension and retraction of one or more of the wheels 104 via the suspension system 126 may improve the performance of the vehicle, for example, as it travels around curves and/or accelerates and brakes. For example, an extension force may be applied by the damper actuators 148 on the wheels 104 of the of the vehicle on the outside of the curve to substantially prevent (or mitigate) the vehicle chassis 124 from rolling (e.g., tipping outward). In some examples, as explained, the suspension system 126 may be used to control the attitude of the vehicle chassis 124 as it travels across the surface 118. For example, an extension force may be applied by the damper actuators 148 associated with the rear wheels 104 of the of the vehicle 102 as the vehicle 102 accelerates to control (or mitigate) the pitch and/or weight transfer to the rear wheels 104 of the vehicle 102 under acceleration, and/or an extension force may be applied by the damper actuators 148 associated with the front wheels 104 of the of the vehicle 102 as the vehicle 102 brakes to control (or mitigate) the pitch and/or weight transfer to the front wheels 104 of the vehicle 102 under braking. In some examples, the suspension system 126 may operate in both a passive manner and an active manner. For example, if active control is deactivated or otherwise not operating, the spring and damper assembly 130 may continue to operate in a passive manner.

In some examples of the suspension system 126, for example, as shown in FIG. 1, the spring 132 may include a pneumatic spring, and the suspension system 126 may further include a spring actuator 172 located remotely from the pneumatic spring and configured to control an amount of deflection of the pneumatic spring and/or to alter a spring rate of the pneumatic spring. This, in some examples, may result in altering a ride height a corner of the vehicle 102 associated with the spring and damper assembly 130 as the pneumatic spring changes length. In some examples, the damper actuator 148 may be coupled to (e.g., integral with) the spring actuator 172, such that activation of the damper actuator 148 causes activation of the spring actuator 172. For example, as shown in FIG. 1, the spring actuator 172 may include a spring actuator rod 174 coupled to (or integrally formed with) the damper actuator rod 158. The spring actuator 172 may also include a pneumatic piston 176 coupled to the spring actuator rod 174 and/or the damper actuator rod 158, such that movement of the spring actuator rod 174 and/or the damper actuator rod 158 causes movement of the pneumatic piston 176. The spring actuator 172 may include a spring actuator cylinder 178, and the pneumatic piston 176 and the spring actuator cylinder 178 may define a spring actuator extension chamber 180 and a spring actuator retraction chamber 182. In the example shown, the spring actuator extension chamber 180 is coupled to the spring 132 (e.g., the pneumatic spring) via a pneumatic line 184 providing flow communication between the spring 132 and the spring actuator extension chamber 180. In such examples, when activation of the damper actuator 148 causes expansion of the damper actuator extension chamber 162, the pneumatic piston 176 moves to compress the spring actuator extension chamber 180, thereby increasing air volume and/or pressure in the spring 132 (e.g., the pneumatic spring), which, in turn, increases the length of the spring 132 and/or the spring rate of the spring 132. Conversely, when activation of the damper actuator 148 causes compression of the damper actuator extension chamber 162, the pneumatic piston 176 moves to expand the spring actuator extension chamber 180, thereby decreasing air volume and/or pressure in the spring 132 (e.g., the pneumatic spring), which, in turn, reduces the length of the spring 132 and/or the spring rate of the spring 132. The ratio of the volume through which the pneumatic piston 176 moves (i.e., the cross-sectional area multiplied by the stroke of the pneumatic piston 176) relative to the volume through which the damper actuator piston 160 moves (e.g., the cross-sectional area of the damper actuator piston 160 multiplied by the stroke of the damper actuator piston 160) determines the spring rate change of the spring 132 relative to the level of damping change in the damper member 134. Thus, in some examples, the respective cross-sectional areas of the pneumatic piston 176 and the damper actuator piston 160 may be tailored to achieve a desired system response.

Although the damper actuator 148 and the spring actuator 172 are shown in close proximity with respect to the spring and damper assembly 130 for the purpose of clarity in FIG. 1, the damper actuator 148 and spring actuator 172 may be physically spaced from the spring and damper assembly 130 and may be coupled to the spring and damper assembly 130 solely by the fluid lines 166, 168, and 170, and/or the pneumatic line 184. For example, although the spring and damper assembly 130 is physically coupled to a corresponding wheel 104, for example, via control members, the damper actuator 132 and/or the spring actuator 172 may be located elsewhere in the vehicle 102, for example, at a location providing favorable component packaging and/or weight distribution. In addition, or alternatively, the ability to locate the damper actuator 132 and/or the spring actuator 172 remotely relative to the location of the spring and damper assembly 130 may provide relatively more space for the wheel 104 coupled to the spring and damper assembly 130 to travel from an extended position to a retracted position (e.g., allowing for more suspension travel), and/or more clearance for the wheel to pivot for steering (e.g., allowing for greater steering angles).

In some examples, the spring actuator 172 may be located in a portion of the vehicle 102 spaced from the spring 132. For example, the spring actuator 172 may be located in portion of the vehicle 102 to lower the center of gravity of the vehicle 102, for example, in a lower portion of the vehicle chassis 124 (e.g., under the floor). In some examples, the spring actuator 132 may be located behind and/or under seats of the vehicle 102.

Figure 2:
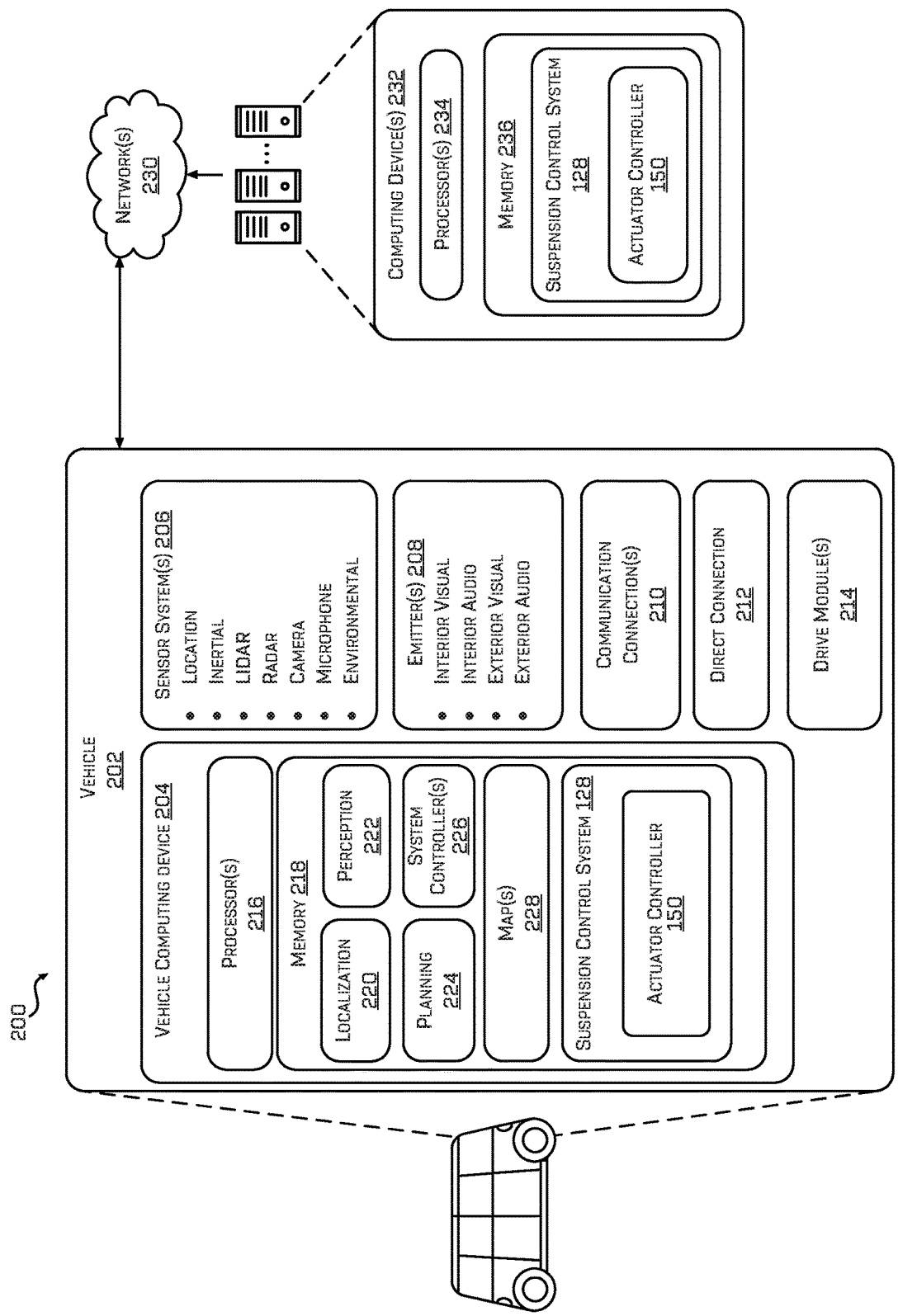
FIG. 2 is a block diagram of an example system for implementing the suspension system and related techniques described herein.

FIG. 2 depicts a block diagram of an example system 200 for implementing the techniques described herein. In at least some examples, the system 200 may include a vehicle 202, which may correspond to the example vehicle 102 shown in FIG. 1. The vehicle 202 may include a vehicle computing device 204, one or more sensor systems 206, one or more emitters 208, one or more communication connections 210, at least one direct connection 212, and one or more drive modules 214.

The vehicle computing device 204 may include one or more processors 216 and memory 218 communicatively coupled with the one or more processors 216. In the illustrated example, the vehicle 202 is an autonomous vehicle. However, the vehicle 202 may be any other type of vehicle. In the illustrated example, the memory 218 of the vehicle computing device 204 stores a localization component 220, a perception component 222, a planning component 224, one or more system controllers 226, one or more maps 228, and an example suspension control system 128, including an example actuator controller 150. Though depicted in FIG. 2 as residing in memory 218 for illustrative purposes, it is contemplated that the localization component 220, the perception component 222, the planning component 224, the one or more system controllers 226, the one or more maps 228, and the suspension control system 128 may additionally, or alternatively, be accessible to the vehicle 202 (e.g., stored on, or otherwise accessible by, memory remote from the vehicle 202).

In at least one example, the localization component 220 may be configured to receive data from the sensor system(s) 206 to determine a position and/or orientation of the vehicle 202 (e.g., one or more of an x-, y-, z-position, roll, pitch, or yaw). For example, the localization component 220 may include and/or request/receive a map of an environment and may continuously determine a location and/or orientation of the autonomous vehicle within the map. In some examples, the localization component 220 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 220 may provide data to various components of the vehicle 202 to determine an initial position of an autonomous vehicle for generating a candidate trajectory, as discussed herein.

In some examples, the perception component 222 may be configured to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In at least one example, the planning component 224 may determine a location of a user based on image data of an environment received from the user using, for example, bags of binary words with image based features, artificial neural network, and the like. Further, the planning component 224 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 202 may stop to pick up a passenger. In at least one example, the planning component 224 may determine a pickup location based at least in part on determining a user identity (e.g., determined via image recognition or received as an indication from a user device, as discussed herein).

In at least one example, the vehicle computing device 204 may include one or more system controllers 226, which may be configured to control steering, propulsion, braking, safety, emitters, communication, and other systems of the vehicle 202. These system controller(s) 226 may communicate with and/or control corresponding systems of the drive module(s) 214 and/or other components of the vehicle 202.

The memory 218 may further include one or more maps 228 that may be used by the vehicle 202 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed. In at least one example, the one or more maps 228 may include at least one map (e.g., images and/or a mesh). In some example, the vehicle 202 may be controlled based at least in part on the maps 228. That is, the maps 228 may be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 may be stored on a remote computing device(s) (such as the computing device(s) 232) accessible via network(s) 230. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

As shown in FIG. 2, in some examples, the suspension control system 128 for may be stored in the memory 218 of the computing device 204 of the vehicle 202 or remote from the vehicle 202 in the memory 236 of the computing device(s) 232. In some examples, some portions of the suspension control system 128 may be stored in the memory 218 of the computing device 204 of the vehicle 202, and other portions of suspension control system 128 may be stored remotely in the memory 236 of the computing device(s) 232, and the separately located portions of the suspension control system 128 may operate together in a coordinated manner.

In some examples, aspects of some or all of the components discussed herein may include any models, algorithms, and/or machine learning algorithms. For example, in some examples, the components in the memory 218 and/or the memory 236 may be implemented as a neural network.

As described herein, an exemplary neural network is a biologically inspired algorithm which passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 206 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 206 may include multiple examples of each of these or other types of sensors. For example, the LIDAR sensors may include individual LIDAR sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing device 204. Additionally, or alternatively, the sensor system(s) 206 may send sensor data, via the one or more networks 230, to the one or more computing device(s) at a particular frequency, after a lapse of a predetermined period of time, in near real-time, etc.

The vehicle 202 may also include one or more emitters 208 for emitting light and/or sound, as described above. The emitters 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 202 may also include one or more communication connection(s) 210 that enable communication between the vehicle 202 and one or more other local or remote computing device(s). For example, the communication connection(s) 210 may facilitate communication with other local computing device(s) on the vehicle 202 and/or the drive module(s) 214. Also, the communication connection(s) 210 may allow the vehicle 202 to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 may include physical and/or logical interfaces for connecting the vehicle computing device 204 to another computing device or a network, such as network(s) 230. For example, the communications connection(s) 210 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive modules 214. In some examples, the vehicle 202 may have a single drive module 214. In at least one example, if the vehicle 202 has multiple drive modules 214, individual drive modules 214 may be positioned on opposite ends of the vehicle 202 (e.g., the front and the rear, etc.). In at least one example, the drive module(s) 214 may include one or more sensor systems to detect conditions of the drive module(s) 214 and/or the surroundings of the vehicle 202. By way of example and not limitation, the sensor system(s) 206 may include one or more wheel encoders (e.g., rotary encoders) to sense rotation of the wheels (e.g., wheels 104 in FIG. 1)) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 214. In some cases, the sensor system(s) on the drive module(s) 214 may overlap or supplement corresponding systems of the vehicle 202 (e.g., sensor system(s) 206).

The drive module(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 may provide a physical interface to couple the one or more drive module(s) 214 with the body of the vehicle 202. For example, the direction connection 212 may allow the transfer of energy, fluids, air, data, etc. between the drive module(s) 214 and the vehicle 202. In some examples, the direct connection 212 may further releasably secure the drive module(s) 214 to the body of the vehicle 202.

In at least one example, the localization component 220, perception component 222, the planning component 224, and/or the suspension control system 128 may process sensor data, as described above, and may send their respective outputs, over the one or more network(s) 230, to one or more computing device(s) 232. In at least one example, the localization component 220, the perception component 222, the planning component 224, and/or the suspension control system 128 may send their respective outputs to the one or more computing device(s) 232 at a particular frequency, after a lapse of a predetermined period of time, in near real-time, etc.

The processor(s) 216 of the vehicle 202 and/or the processor(s) 234 of the computing device(s) 232 may be any suitable processor capable of executing instructions to process data and perform operations as described herein. By way of example and not limitation, the processor(s) 216 and 234 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and 236 are examples of non-transitory computer-readable media. The memory 218 and 236 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 2 is illustrated as a distributed system, in alternative examples, components of the vehicle 202 may be associated with the computing device(s) 232, and/or components of the computing device(s) 232 may be associated with the vehicle 202. That is, the vehicle 202 may perform one or more of the functions associated with the computing device(s) 232, and vice versa.

Figure 3:
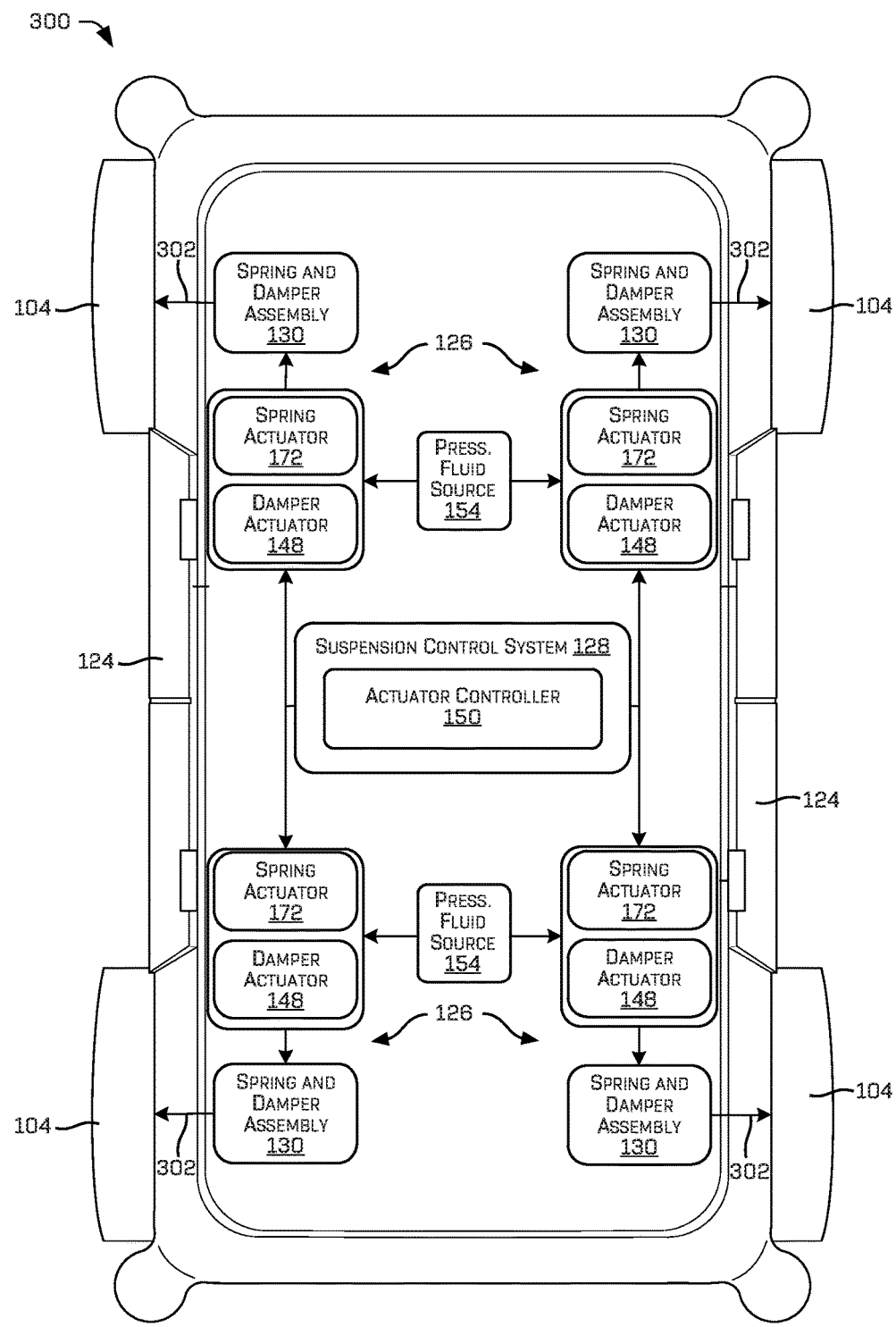
FIG. 3 is a schematic top view of an example vehicle including an example suspension system.

FIG. 3 is a schematic top view of an example vehicle 300, which may correspond to the example vehicle 102 shown in FIG. 1. The example vehicle 300 may include the example suspension system 126 shown in FIG. 3. The example vehicle 300 includes four wheels 104 located generally at four respective corners of the vehicle chassis 124. Each of the wheels 104 may be coupled to the vehicle chassis 124 via a respective spring and damper assembly 130. For example, the spring and damper assemblies 130 may be coupled to a respective wheel via suspension control arms 302 schematically depicted in FIG. 3. As explained herein, in some examples, the spring and damper assemblies 130 may include a damper member having a strut (see FIG. 1) coupled to respective control arms 302, and the spring and damper assemblies 130 may be configured to permit each of the wheels 104 to extend and retract relative to the vehicle chassis 124, for example, as the vehicle 300 travels across a surface 118 and encounters unevenness in the surface 118. In some examples, as explained herein, the suspension system 126 may be configured to permit two or four of the wheels 104 to pivot to create steering angles for maneuvering the vehicle 300.

As shown in FIG. 3, the example vehicle 300 also includes a damper actuator 148 and a spring actuator 172 at each of the four wheels 104 and in fluid communication with a pressurized fluid source 154 and respective ones of the spring and damper assembly 130. Although FIG. 3 shows two pressurized fluid sources 154 at opposite ends of the vehicle 300, the vehicle 300 may include fewer (e.g., one) or more (e.g., four) pressurized fluid sources 154, which may include a fluid pump and/or fluid reservoir. In some examples, as explained with respect to FIG. 1, the suspension system 126 may also include a hydraulic control valve controlling the flow of fluid relative to one or more of the damper actuators 148 and one or more of the spring and damper assemblies 130 (e.g., to the damper members 134). In some examples, the hydraulic control valve may be controlled by the suspension control system 128, which may include an actuator controller 150, which may control operation of the hydraulic control valve, for example, as described herein.

FIGS. 4A, 4B, and 4C are schematic views of an example spring and damper assembly 130, an example damper actuator 148, and an example spring actuator 172, with the damper member rod 140 shown respectively in a neutral condition (FIG. 4A), a retracted condition (FIG. 4B), and an extended condition (FIG. 4C). As explained herein with respect to FIG. 1, the damper member rod 140 may serve as a strut coupled to a wheel 104 (FIGS. 1 and 3), for example, via control members, and thus, reciprocating the damper member rod 140 relative to the damper member cylinder 138 results in extending and retracting the wheel 104 relative to the vehicle chassis 124 (FIGS. 1 and 3).

FIG. 4A shows the damper member rod 140 in a neutral condition, which may correspond to the position of the damper member rod 140 when the vehicle 102 is travelling, for example, on a relatively level, smooth surface 118, and in some instances, in a relatively straight line. In order to retract the damper member rod 140, for example, as shown in FIG. 4B, the hydraulic control valve 152 may be operated, for example, by the actuator controller 150 (FIG. 1) to supply pressurized fluid, for example, from a pressurized fluid source 154 (FIGS. 1 and 3), via the third fluid line 170 to the damper member retraction chamber 146. When the fluid is supplied to the damper member retraction chamber 146, the hydraulic control valve 152 may also be operated to permit fluid in the damper actuator expansion chamber 162 to flow from the damper actuator 148 to the hydraulic control valve 152 via the second fluid line 168. In addition, the piston 176 of the spring actuator 172, coupled to the damper actuator 148, moves to the right (as shown) and allows air volume and/or pressure in the spring 132 to reduce, thereby resulting in the spring 132 shortening in length. In some examples, the damper member rod 140 may be retracted to retract the corresponding wheel 104, for example, in order to reduce the force exerted on the vehicle chassis 124 as the wheel 104 travels over a bump or protrusion on the surface 118 over which the vehicle 102 is traveling.

In order to extend the damper member rod 140, for example, as shown in FIG. 4C, the hydraulic control valve 152 may be operated, for example, by the actuator controller 150 (FIG. 1) to supply pressurized fluid, for example, from a pressurized fluid source 154 (FIGS. 1 and 3), via the first fluid line 166 to the damper member extension chamber 144. When the fluid is supplied to the damper member extension chamber 144, the hydraulic control valve 152 may also be operated to permit fluid in the damper member retraction chamber 146 to flow from the damper member 134 to the hydraulic control valve 152 via the third fluid line 170. In addition, the piston 176 of the spring actuator 172, coupled to the damper actuator 148, moves to the left (as shown) and forces air volume and/or pressure into the spring 132, thereby resulting in the spring 132 lengthening. In some examples, the damper member rod 140 may be extended to extend the corresponding wheel 104, for example, in order to reduce the force exerted on the vehicle chassis 124 as the wheel 104 drops into a depression (e.g., a pothole) on the surface 118 over which the vehicle 102 is traveling.

FIGS. 5A, 5B, 5C, 5D, and 5E are side views an example sequence in which an example vehicle 102 having an example suspension system 126 and corresponding wheel 104 travels across an example uneven surface 118 including an example depression 120 and an example bump or protrusion 122, showing examples of how the suspension system 126 operates to reduce the force transmitted to the vehicle chassis 124 as the wheel 104 travels into the depression 120 and over the bump or protrusion 122. For example, as shown in FIGS. 5A-5E, as the wheel 104 of the vehicle 102 travels over the depression 120 and bump or protrusion 122, the vehicle chassis 124 remains substantially undisturbed, substantially maintaining the same ride height and level attitude, for example, as schematically depicted relative to reference lines 500, which are aligned with an upper surface 502 of the vehicle chassis 124 in each of FIGS. 5A-5E.

In FIG. 5A of the example sequence, the leading wheel 104 of the vehicle 102 is on an even and level surface 118 devoid of depressions 120 or bumps 122. As shown, the vehicle attitude is level, the upper surface 502 of the vehicle chassis 124 is aligned with the reference line 500, and the suspension system 126 is in the neutral condition, for example, as shown in FIG. 4A.

In FIG. 5B of the example sequence, the leading wheel 104 of the vehicle 102 has dropped down into the depression 120 of the surface 118. In contrast to FIG. 5A, the suspension system 126 has operated to extend the damper member rod 140 and thus the wheel 104 from the vehicle chassis 124, for example, as shown and described herein with respect to FIG. 4C. The damper actuator 148, controlled for example by the actuator controller 150, has caused the damper member rod 140 to extend and absorb the depression 120. In some examples, the vehicle 102 may use the perception component 222 (or otherwise receive information, e.g., from a map) to identify the depression 120, and the suspension control system 128 may cause the actuator controller 150 to control the hydraulic control valve 152 to provide pressurized fluid from the pressurized fluid source 154 to the damper actuator extension chamber 162 to extend the damper member rod 140. In this example manner, the suspension system 126 has operated such that the vehicle attitude has remained level, and the ride height has remained constant, as depicted by the upper surface 502 of the vehicle chassis 124 being aligned with the reference line 500.

In FIG. 5C of the example sequence, the leading wheel 104 of the vehicle 102 has returned to an even and level surface 118 devoid of depressions 120 or bumps 122. As shown, the vehicle attitude is level, the upper surface 502 of the vehicle chassis 124 is aligned with the reference line 500, and the suspension system 126 has returned to the neutral condition, for example, as shown in FIG. 4A.

In FIG. 5D of the example sequence, the leading wheel 104 of the vehicle 102 has travelled to the apex of the bump or protrusion 122 of the surface 118. In contrast to FIG. 5C, the suspension system 126 has operated to retract the damper member rod 140 and thus the wheel 104 into or toward the vehicle chassis 124, for example, as shown and described herein with respect to FIG. 4B. The hydraulic control valve 152, controlled for example by the actuator controller 150, has caused the damper member rod 140 to retract and absorb the bump or protrusion 122. In some examples, the vehicle 102 may use the perception component 222 (or receive information from another data source, e.g., by receiving map data) to identify the bump or protrusion 122, and the suspension control system 128 may cause the actuator controller 150 to control the hydraulic control valve 152 to provide pressurized fluid from the pressurized fluid source 154 to the damper member retraction chamber 146 to retract the damper member rod 140. In this example manner, the suspension system 126 has operated such that the vehicle attitude has remained level, and the ride height has remained constant, as depicted by the upper surface 502 of the vehicle chassis 124 being aligned with the reference line 500 in FIG. 5D.

In FIG. 5E of the example sequence, the leading wheel 104 of the vehicle 102 has returned to an even and level surface 118 devoid of depressions 120 or bumps 122. As shown, the vehicle attitude is level, the upper surface 502 of the vehicle chassis 124 is aligned with the reference line 500, and the suspension system 126 has returned to the neutral condition, for example, as shown and described with respect to FIG. 4A.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Figure 6:
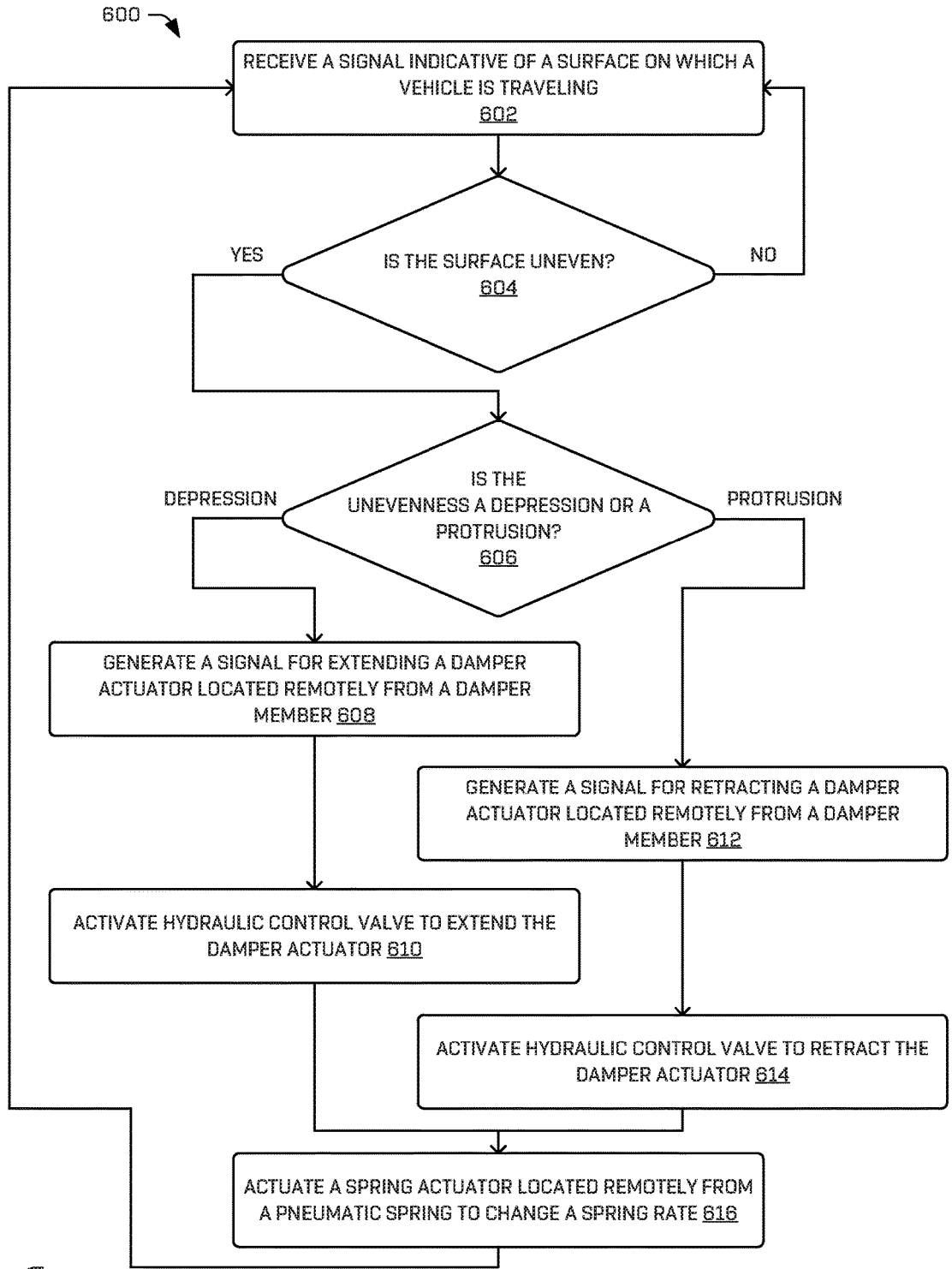
FIG. 6 is a flow diagram of an example process for controlling movement of a vehicle wheel relative to a vehicle chassis of a vehicle.

FIG. 6 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an example process 600 for controlling movement of a vehicle wheel relative to a vehicle chassis.

At 602, the example process 600 may include receiving a signal indicative of a surface on which a vehicle is travelling. In some examples, the signal may be indicative of an unevenness of a surface on which a vehicle is traveling. In some examples, such a signal may be generated by, for example, a perception component associated with the vehicle, received as a signal (or as part of map data), and/or a sensor system associated with the vehicle, for example, as described herein with respect to FIG. 2.

At 604, the example process 600 may further include determining, based at least in part in the signal indicative of the surface, whether the surface is uneven, for example, as described herein. If the surface in not uneven, the process 600 may revert back to 602.

On the other hand, if the signal is indicative of the surface being uneven, at 606, the process 600 may include determining whether the unevenness is a depression (e.g., pothole) or a protrusion (e.g., a speedbump), relative to the particular wheel expected to traverse that portion of the environment. In some examples, this determination may be performed by the perception component, signals received (e.g. from a map), and/or the sensor systems. In some examples, this may be determined by a suspension control system, for example, as described herein.

If the unevenness is a depression, the process 600 may, at 608, generate a signal for extending a damper actuator located remotely from a damper member associated with a wheel (or wheels) approaching the depression. In some examples, an actuator controller may generate such a signal, for example, as described herein.

In some such instances, at 610, the process 600 may include activating a control valve to extend the damper actuator based at least in part on the signal for extending the damper actuator. For example, the damper actuator may include a hydraulic cylinder, and the control valve may be a hydraulic control valve configured to supply pressurized fluid to the damper actuator to cause the damper actuator to extend, which, in turn, causes the damper member to extend, thereby causing a wheel coupled to the damper member to extend and absorb the depression.

If at 606, the unevenness is determined to be a protrusion, at 612, the process 600 may include generating a signal for retracting a damper actuator located remotely from a damper member coupled to the wheel approaching the protrusion. In some examples, an actuator controller may generate such a signal, for example, as described herein.

In some such instances, at 614, the process 600 may include activating a control valve to retract the damper actuator based at least in part on the signal for retracting the damper actuator. For example, the damper actuator may include a hydraulic cylinder, and the control valve may be a hydraulic control valve configured to supply pressurized fluid to the damper actuator to cause the damper actuator to retract, which, in turn, causes the damper member to retract, thereby causing a wheel coupled to the damper member to retract and absorb the protrusion.

In some examples, the process 600, at 616, may include actuating a spring actuator located remotely from a pneumatic spring to change a spring rate of the pneumatic spring.

For example, the spring actuator may be coupled to the damper actuator, and the spring actuator may be activated upon activation of the damper actuator, for example, as described herein. In some examples, if the damper actuator is actuated to extend the damper member, the spring actuator may act to increase the spring rate of the pneumatic spring. Alternatively, if the damper actuator is actuated to retract the damper member, the spring actuator may act to reduce the spring rate of the pneumatic spring.

The systems, components, and methods described herein may be implemented using any combination of software or hardware elements. The systems, components, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations may be performed in combination with other types of program components. Generally, program components include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. An example vehicle comprising:
a vehicle chassis;
a wheel;
a spring and damper assembly coupling the wheel to the vehicle chassis for movement of the wheel relative to the vehicle chassis, the spring and damper assembly comprising a spring coupled to a damper member;
a damper actuator located remotely from the spring and damper assembly and coupled to the damper member; and
a spring actuator coupled to the damper actuator and configured to control an amount of deflection of the spring.

B. The vehicle of example A, wherein the damper actuator comprises a hydraulic cylinder coupled to the damper member and configured to cause the damper member to extend and retract.

C. The vehicle of example A or example B, wherein the spring comprises a pneumatic spring, and wherein the spring actuator is located remotely from the pneumatic spring and configured to change a volume of air in the pneumatic spring.

D. The vehicle of any one of example A through example C, wherein activation of the damper actuator causes activation of the spring actuator.

E. The vehicle of any one of example A through example D, wherein the damper actuator comprises a damper actuator rod, and the spring actuator comprises a spring actuator rod coupled to the damper actuator rod.

F. The vehicle of any one of example A through example E, further comprising:
a pneumatic line coupled to the spring actuator and the pneumatic spring and providing flow communication between the spring actuator and the pneumatic spring; and
a hydraulic line coupled to the damper actuator and the damper member and providing flow communication between the damper actuator and the damper member.

G. An example apparatus comprising:
a spring and damper assembly for coupling a vehicle wheel to a vehicle chassis, the spring and damper assembly comprising a pneumatic spring coupled to a damper member configured to extend and retract;
a damper actuator located remotely from the spring and damper assembly and configured to cause the damper member to extend and retract; and
a spring actuator coupled to the damper actuator and configured to change a volume of air in the pneumatic spring.

H. The apparatus of example G, wherein the damper actuator comprises a hydraulic cylinder coupled to the damper member and configured to cause the damper member to extend and retract.

I. The apparatus of example G or example H, wherein the damper member comprises:
a damper cylinder;
a damper rod coupled to the damper cylinder and configured to extend and retract relative to the damper cylinder; and
a damper piston coupled to the damper rod, the damper cylinder and the damper piston defining a damper extension chamber and a damper retraction chamber, the damper extension chamber and the damper retraction chamber configured to send and receive fluid from the damper actuator causing extension and retraction of the damper rod relative to the damper cylinder.

J. The apparatus of any one of example G through example I, wherein the damper actuator comprises a hydraulic cylinder hydraulically coupled to the damper member via a hydraulic line and configured to cause the damper member to extend and retract.

K. The apparatus of any one of example G through example J, wherein the damper actuator comprises:
a damper actuator cylinder;
a damper actuator rod coupled to the damper actuator cylinder and configured to extend and retract relative to the damper actuator cylinder; and
a damper actuator piston coupled to the damper actuator rod, the damper actuator cylinder and the damper actuator piston defining a damper actuator extension chamber and a damper actuator retraction chamber, the damper actuator extension chamber and the damper actuator retraction chamber configured to receive fluid causing extension and retraction of the damper actuator rod relative to the damper actuator cylinder.

L. The apparatus of any one of example G through example K, wherein the damper actuator is coupled to the damper member in a non-linear manner.

M. The apparatus of any one of example G through example L, wherein activation of the damper actuator causes activation of the spring actuator.

N. The apparatus of any one of example G through example M, wherein the damper actuator comprises a damper actuator rod, and the spring actuator comprises a spring actuator rod coupled to the damper actuator rod.

O. The apparatus of any one of example G through example N, wherein the spring actuator comprises a pneumatic piston coupled to the damper actuator rod, such that movement of the damper actuator rod causes movement of the pneumatic piston.

P. The apparatus of any one of example G through example 0, further comprising:
a pneumatic line providing pneumatic flow communication between the spring actuator and the pneumatic spring; and
a hydraulic line providing hydraulic flow communication between the damper actuator and the damper member.

Q. The apparatus of any one of example G through example P, further comprising a hydraulic control valve in flow communication with the damper actuator and configured to control flow of fluid to and from the damper actuator.

R. An example method comprising:
actuating a damper actuator located remotely from a damper member, the damper member configured to be coupled to a vehicle wheel and a vehicle chassis, which, when actuated, causes the damper member to one of extend or retract relative to the vehicle chassis; and actuating a spring actuator located remotely from a spring coupled to the damper member to control an amount of deflection of the spring.

S. The method of example R, wherein actuating the damper actuator comprises operating a hydraulic control valve in flow communication with the damper actuator, and wherein actuating the damper actuator causes movement of the vehicle wheel relative to the vehicle chassis.

T. The method of example R or example S, wherein the spring actuator is coupled to the damper actuator, and wherein actuating the damper actuator and actuating the spring actuator comprises concurrently actuating the damper actuator and actuating the spring actuator.

What is claimed is:

1. A vehicle comprising:
a vehicle chassis;
a wheel;
a spring and damper assembly coupling the wheel to the vehicle chassis for movement of the wheel relative to the vehicle chassis, the spring and damper assembly comprising a spring coupled to a damper member;
a damper actuator located remotely from the spring and damper assembly and coupled to the damper member; and
a spring actuator coupled to the damper actuator and configured to control an amount of deflection of the spring.

2. The vehicle of claim 1, wherein the damper actuator comprises a hydraulic cylinder coupled to the damper member and configured to cause the damper member to extend and retract.

3. The vehicle of claim 1, wherein the spring comprises a pneumatic spring, and wherein the spring actuator is located remotely from the pneumatic spring and configured to change a volume of air in the pneumatic spring.

4. The vehicle of claim 1, wherein activation of the damper actuator causes activation of the spring actuator.

5. The vehicle of claim 1, wherein the damper actuator comprises a damper actuator rod, and the spring actuator comprises a spring actuator rod coupled to the damper actuator rod.

6. The vehicle of claim 5, further comprising:
a pneumatic line coupled to the spring actuator and the pneumatic spring and providing flow communication between the spring actuator and the pneumatic spring; and
a hydraulic line coupled to the damper actuator and the damper member and providing flow communication between the damper actuator and the damper member.

7. An apparatus comprising:
a spring and damper assembly for coupling a vehicle wheel to a vehicle chassis, the spring and damper assembly comprising a pneumatic spring coupled to a damper member configured to extend and retract;
a damper actuator located remotely from the spring and damper assembly and configured to cause the damper member to extend and retract; and
a spring actuator coupled to the damper actuator and configured to change a volume of air in the pneumatic spring.

8. The apparatus of claim 7, wherein the damper actuator comprises a hydraulic cylinder coupled to the damper member and configured to cause the damper member to extend and retract.

9. The apparatus of claim 7, wherein the damper member comprises:
a damper cylinder;
a damper rod coupled to the damper cylinder and configured to extend and retract relative to the damper cylinder; and
a damper piston coupled to the damper rod, the damper cylinder and the damper piston defining a damper extension chamber and a damper retraction chamber, the damper extension chamber and the damper retraction chamber configured to send and receive fluid from the damper actuator causing extension and retraction of the damper rod relative to the damper cylinder.

10. The apparatus of claim 9, wherein the damper actuator comprises a hydraulic cylinder hydraulically coupled to the damper member via a hydraulic line and configured to cause the damper member to extend and retract.

11. The apparatus of claim 10, wherein the damper actuator comprises:
a damper actuator cylinder;
a damper actuator rod coupled to the damper actuator cylinder and configured to extend and retract relative to the damper actuator cylinder; and
a damper actuator piston coupled to the damper actuator rod, the damper actuator cylinder and the damper actuator piston defining a damper actuator extension chamber and a damper actuator retraction chamber, the damper actuator extension chamber and the damper actuator retraction chamber configured to receive fluid causing extension and retraction of the damper actuator rod relative to the damper actuator cylinder.

12. The apparatus of claim 7, wherein the damper actuator is coupled to the damper member in a non-linear manner.

13. The apparatus of claim 7, wherein activation of the damper actuator causes activation of the spring actuator.

14. The apparatus of claim 7, wherein the damper actuator comprises a damper actuator rod, and the spring actuator comprises a spring actuator rod coupled to the damper actuator rod.

15. The apparatus of claim 14, wherein the spring actuator comprises a pneumatic piston coupled to the damper actuator rod, such that movement of the damper actuator rod causes movement of the pneumatic piston.

16. The apparatus of claim 7, further comprising:
a pneumatic line providing pneumatic flow communication between the spring actuator and the pneumatic spring; and
a hydraulic line providing hydraulic flow communication between the damper actuator and the damper member.

17. The apparatus of claim 7, further comprising a hydraulic control valve in flow communication with the damper actuator and configured to control flow of fluid to and from the damper actuator.

18. A method comprising:
actuating a damper actuator located remotely from a damper member, the damper member configured to be coupled to a vehicle wheel and a vehicle chassis, which, when actuated, causes the damper member to one of extend or retract relative to the vehicle chassis; and
actuating a spring actuator located remotely from a spring coupled to the damper member to control an amount of deflection of the spring.

19. The method of claim 18, wherein actuating the damper actuator comprises operating a hydraulic control valve in flow communication with the damper actuator, and wherein actuating the damper actuator causes movement of the vehicle wheel relative to the vehicle chassis.

20. The method of claim 18, wherein the spring actuator is coupled to the damper actuator, and wherein actuating the damper actuator and actuating the spring actuator comprises concurrently actuating the damper actuator and actuating the spring actuator.

* * * * *